United States Patent [19]
MacDonald et al.

[11] Patent Number: 6,027,951
[45] Date of Patent: Feb. 22, 2000

[54] METHOD OF MAKING HIGH ASPECT RATIO PROBES WITH SELF-ALIGNED CONTROL ELECTRODES

[76] Inventors: Noel C. MacDonald, 224 Phillips Hall, Ithaca, N.Y. 14850; Z. Lisa Zhang, 2343 W. Main St., Suite 1167, Mesa, Ariz. 85201

[21] Appl. No.: 09/135,176

[22] Filed: Aug. 18, 1998

Related U.S. Application Data

[60] Division of application No. 08/573,308, Dec. 15, 1995, Pat. No. 5,844,251, which is a continuation-in-part of application No. 08/177,735, Jan. 5, 1994, abandoned.

[51] Int. Cl.$^7$ .................................................. H01L 21/00
[52] U.S. Cl. .............................. 438/20; 257/10; 313/336
[58] Field of Search ..................... 438/20, 17, 18, 438/DIG. 954, FOR 101, FOR 102; 257/10; 313/336

[56] References Cited

U.S. PATENT DOCUMENTS

| | | | |
|---|---|---|---|
| 3,789,471 | 2/1974 | Spindt et al. | 445/52 |
| 3,970,087 | 7/1976 | Smith et al. | 604/387 |
| 4,095,133 | 6/1978 | Hoeberechts | 313/336 |
| 4,168,213 | 9/1979 | Hoebrechts | 438/20 |
| 4,648,173 | 3/1987 | Malaviya | 438/151 |
| 4,766,340 | 8/1988 | van der mast et al. | 313/366 |
| 4,943,343 | 7/1990 | Bardai et al. | 438/20 |
| 4,964,946 | 10/1990 | Gray et al. | 216/13 |
| 5,057,047 | 10/1991 | Greene et al. | 438/20 |
| 5,063,323 | 11/1991 | Longo et al. | 313/309 |
| 5,085,746 | 2/1992 | Musselman et al. | 204/129.4 |
| 5,198,390 | 3/1993 | MacDonald et al. | 438/52 |
| 5,199,917 | 4/1993 | MacDonald et al. | 445/24 |
| 5,201,992 | 4/1993 | Marcus et al. | 156/643 |
| 5,242,541 | 9/1993 | Bayer et al. | 156/653 |
| 5,282,924 | 2/1994 | Bayer et al. | 156/643 |
| 5,302,234 | 4/1994 | Roe et al. | 156/643 |

FOREIGN PATENT DOCUMENTS

| | | |
|---|---|---|
| 0497509 | 5/1992 | European Pat. Off. . |
| 40 00 496 A1 | 2/1991 | Germany . |
| 89/09479 | 5/1989 | WIPO . |

OTHER PUBLICATIONS

Zhang, et al "A RIE Process for Submicron, Silicon Electromechanical Structures," IOP Publishing Ltds., 1992, pp. 31–38.

Arney, et al "Formationof Submicron Silicon–on–Insulator Structures by Lateral Oxidation of Substrate–Silicon Islands, " J. Vac. Sci. Technol. B6 (1), Jan./Feb. 1988, pp. 341–345.

Zhang, et al "An RIE Process for Submicron, Silicon Electromechanical Structures, " IEEE, 1991, pp. 520–523.

Spallas, et al "Self Aligned Silicon–Strip Fiel Emitter Array, " presented at 2nd Int. Conf. on Vac. Microelectron, 1989.

Busta, et al "Trioda Operation of a Vacuum Transistor, " IEEE, 1991, pp. IEDM 91–213 through IEDM 91–214.

*Primary Examiner*—Charles Bowers
*Assistant Examiner*—Evan Pert
*Attorney, Agent, or Firm*—Jones, Tullar & Cooper PC

[57] ABSTRACT

A high aspect ratio field emission or tunnelling probe is fabricated utilizing a single crystal reactive etching and metallization process. The resulting field emission probes have self-aligned single crystal silicon sharp tips, high aspect ratio supporting posts for the tips, and integrated, self-aligned gate electrodes surrounding an electrically isolated from the tips. The gate electrodes are spaced from the tips by between 200 and 800 nm and metal silicide or metal can be applied on the tips to achieve emitter turn on at low operational gate voltages. The resulting tips have a high aspect ratio for use in probing various surface phenomena, and for this purpose, the probes can be mounted on or integrated in a three-dimensional translator for mechanical scanning across the surface and for focusing by adjusting the height of the emitter above the surface.

17 Claims, 3 Drawing Sheets

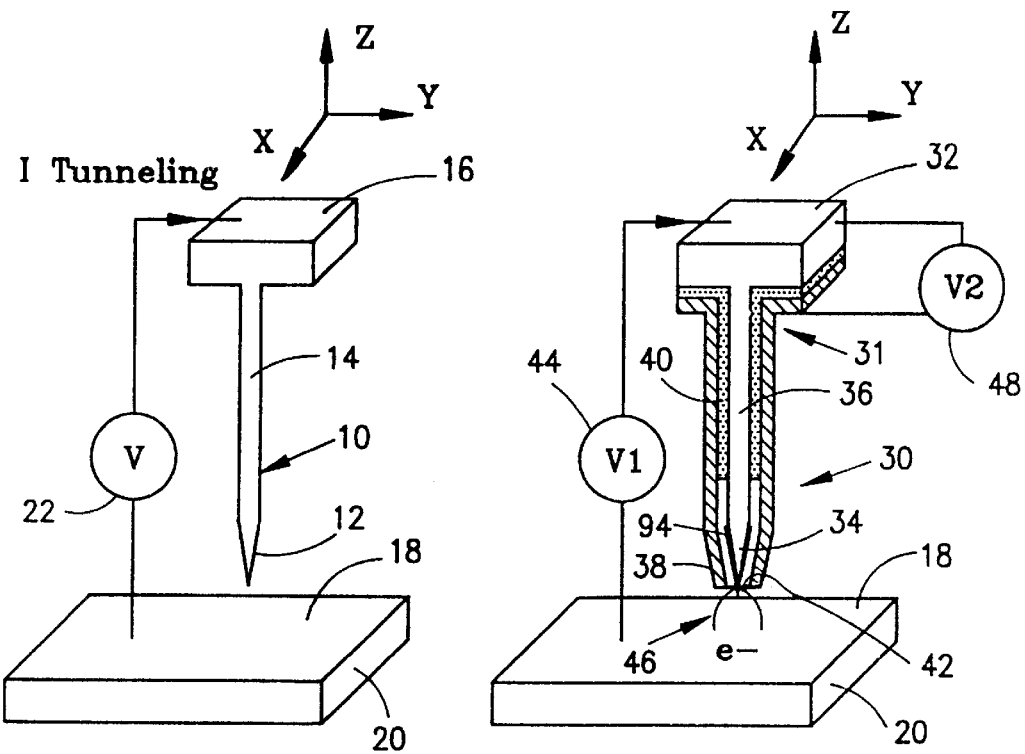
FIG. 1 PRIOR ART
FIG. 2
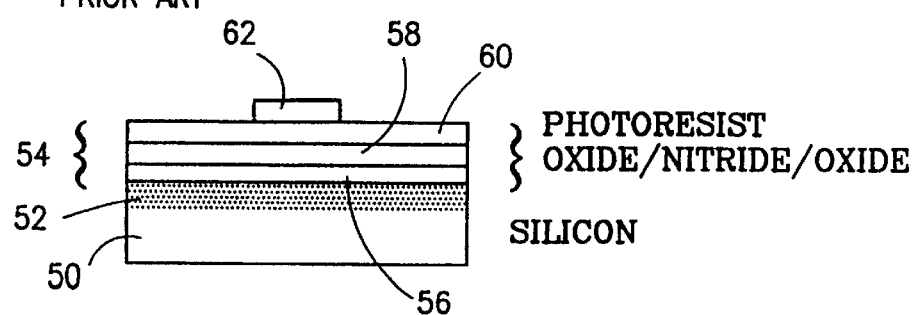
FIG. 3(a)
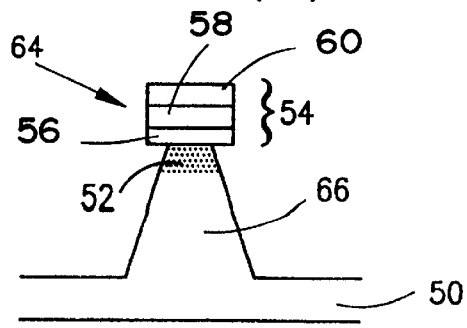
FIG. 3(b)

METHOD OF MAKING HIGH ASPECT RATIO PROBES WITH SELF-ALIGNED CONTROL ELECTRODES

This application is a division of Ser. No. 08/573,308, filed Dec. 15, 1995 (now U.S. Pat. No. 5,844,251) which is a continuation-in-part of U.S. Ser. No. 08/177,735, filed Jan. 5, 1994 (now abandoned); and is related to U.S. application Ser. No. 08/069,725, filed Jun. 1, 1993 (now U.S. Pat. No. 5,536,988), and entitled "Compound Stage MEM Actuator Suspended for Multidimensional Motion."

BACKGROUND OF THE INVENTION

The present invention was made with Government support under Grant No. DABT 63-92-C-0019, awarded by the Advanced Research Projects Agency (ARPA)/Army Research Office (ARO)/MEMS. The Government has certain rights in the invention.

The present invention relates, in general, to microelectromechanical (MEM) devices and structures, and more is particularly to high aspect ratio probes for field emitter tips, tunnelling tips, atomic force tips or the like having self-aligned gate or isolating electrodes, and to methods for the fabrication thereof.

Microelectromechanical devices utilizing micron-dimensioned emitter structures with nanometer-scale tips are exemplified by the cathode arrays illustrated in U.S. Pat. No. 5,199,917. This patent illustrates a silicon tip field emission cathode array wherein emitter tips are formed by an oxidation process and wherein precisely aligned gate electrodes are formed around corresponding emitter tips in such a way that large arrays can be formed with great accuracy and reliability. A suitable process for fabricating such single crystal silicon micromechanical structures is the single crystal reactive etch and metallization process (SCREAM) described in U.S. Pat. No. 5,198,390, the disclosure of which is hereby incorporated herein by reference.

The invention of the scanning tunnelling microscope (STM) has opened the path to atom-scale microscopy, manipulation, metrology, lithography, and spectroscopy. The STM essentially scans a metal probe over a surface to be inspected while maintaining a constant tunnelling current between the probe and the surface, thereby permitting the STM to view the surface being scanned. Later improvements of the STM included such instruments as the atomic force microscope (AFM), as well as a wide range of other related instruments. These instruments, which may generally be referred to as scanned-tip or scanned-probe instruments, each have a probe which incorporates a special tip which is sensitive to a particular nanometer-scale force or field such as a magnetic field, an electric field, a capacitance, or a van der Waals force. The basic components for a scanned-probe instrument are an appropriate tip mounted on a three-dimensional actuator to scan the tip across a surface in an x-y plane and to adjust the height (the z distance) of the tip above the surface. The instrument also incorporates a method to generate a feedback signal derived from an attached sensor to sense the height of the tip above the surface.

The basic problem with such devices, however, is that the probe tips have to be very close to a surface in order to provide the required interaction for detecting and measuring the fields or forces which exist between the tip and the surface. The prior art tip structures made it very difficult to measure rough surfaces, for the surfaces often would come into contact with the tip or the measuring instrument on which it is mounted, preventing it from accurately responding to the shape of the surface. Furthermore, in addition to measuring rough surfaces, it is often desirable to detect and to measure apertures or depressions in the target surface, and these need to be accurately and reliably measured not only as to their location, but as to their depths. However, the short height of electromechanical tips constructed in accordance with the aforementioned patents severely limits the range available for such measurements. Accordingly, there is a need for a scanning probe tip which will be capable of following surface configurations accurately and without the danger of the actuator mechanism striking the surface. For this purpose, a long, thin, needle-like structure having a high aspect ratio is needed.

In the use of scanning probes in atomic force microscopes, the probe tip is generally moved with respect to a surface being inspected. In addition, a voltage may be applied to the tip for the purpose of regulating tunnelling current flow for use in a feedback loop to control the location of the tip with respect of the surface or for the purpose of applying localized voltages to the surface for affecting the force between the tip and atoms on the surface. The interaction between the tip and the surface can be measured by the voltage between the two, with the resulting electric field lines producing forces which can be controlled by varying the height of the probe. However, a highly reliable and accurate control of the voltage as well as of the flow of tunnelling current between the tip and the surface being inspected is required for this purpose.

Since probes such as those discussed above are used to detect or measure very small fields or forces produced by highly localized features on a surface, the measurements are often subject to interference from adjacent features. Accordingly, there is a need to protect the tips from ambient fields or forces during such measurements.

SUMMARY OF THE INVENTION

It is, therefore, an object of the present invention to provide a high aspect ratio microelectromechanical probe tip structure for use with scanning tunnelling microscopes, atomic force microscopes, and the like.

It is another object of the invention to provide a high aspect ratio microelectromechanical probe tip incorporating an electrode for controlling electric and magnetic fields between the tip and a surface to be inspected for regulating the current flow therebetween and for providing a higher degree of sensitivity to field forces in the region of the tip.

It is still another object of the invention to provide a microelectromechanical probe tip for use in scanning surfaces to measure surface configurations on the micron scale, as well as to interact at atomic force levels with the material of the surface through an electric field between the probe tip and the surface.

In accordance with the invention, a microelectromechanical, high aspect ratio probe has been developed for use in scanning tunnelling microscopes, atomic force microscopes, and like scanned-tip or scanned-probe instruments. The probe is capable of being mounted for scanning motion on or integrated with a three-dimensional translator of the type described, for example, U.S. Pat. No. 5,536,988, the three-dimensional translator being used for mechanical positioning and scanning of the probe. The probe of the present invention is capable of use as an electron source when used as a near-field scanning electro microscope, as a scanning tunnelling microscope, or as an atomic force microscope, and is capable of use as a magnetic field, electric field, capacitance, or van den Waals force detector in an atomic force microscope. It is also capable of being used as a current or field source for writing data onto a suitable substrate and for detecting the presence of such data for reading it. The probe of the invention utilizes one or more gate electrodes having apertures which surround a thin, needle-like probe, with the gate aperture being electrically isolated from the probe.

Microelectromechanical devices in which the probe of the invention is integrated may be fabricated utilizing a process similar to the single-crystal reactive etching and metallization process described in the aforesaid U.S. Pat. No. 5,198,390. However, the process of the present invention differs from that of the aforesaid application so as to permit the formation of high aspect ratio, self-aligned gated probes and probe arrays. The resulting probe is a thin, tall, high aspect ratio silicon post, or needle, having a heavily doped silicon tip which may include a metal or metal-silicide coating, the post having a diameter of less than a micron, and being up to 10 microns in height. At least one gate electrode surrounds and is self-aligned with the post and is electrically isolated from it. The electrode extends the length of the post and has an aperture which surrounds, and is spaced from, the tip. In some applications, multiple gate electrodes can be provided. The electrode or electrodes can be used to produce protective electric fields around the tip, as by supplying separate voltages between the electrodes and a nearby surface which is to be measured by the probe. This high aspect ratio post permits nonplanar surfaces to be scanned with a focused, near-field electron source. Various surface phenomena, such as absorption and surface migration in field emission microscopy, surface atom arrangements and atomic compositions in field ion microscopy at atomic levels on the surfaces and the like can be studied by the use of the probe of the present invention. High density data can be stored on the surface and read out by the probe. In addition, the single crystal silicon from which the post is constructed can be doped to provide a vertical resistor in series with the emitter tip to provide a negative feedback mechanism that limits sharp rises in emission current and improves the uniformity of emission over an emitter array.

BRIEF DESCRIPTION OF THE DRAWINGS

The foregoing and additional objects, features, and advantages of the present invention will be apparent to those of skill in the art from the following detailed description of a preferred embodiment thereof, taken in conjunction with the accompanying drawings, in which:

FIG. 1 illustrates in diagrammatic form a prior art high aspect ratio probe for a scanned-probe instrument;

FIG. 2 illustrates in diagrammatic form a high aspect ratio gated probe fabricated in accordance with the present invention;

FIGS. 3(a) through 3(i) illustrate a process of fabricating a microelectromechanical gated probe in accordance with the present invention.

DESCRIPTION OF PREFERRED EMBODIMENTS

Figure 3C:
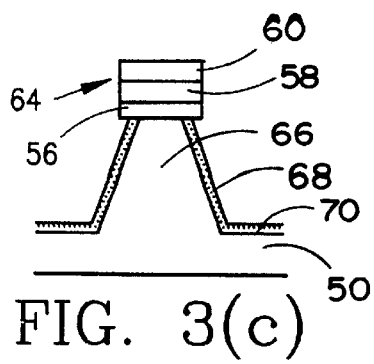

FIG. 1 illustrates a prior art probe 10 such as that used in scanning tunnelling microscopes and like scanned-probe instruments. The probe 10 includes a tip 12 formed on the end of a post 14 which is mounted on or integrated with a three-dimensional actuator 16 to scan the tip across the surface 18 of a specimen 20. The actuator is movable in the x-y direction to scan the tip across the surface, and is movable in the z direction to adjust the height of the tip above the surface. A voltage 22 applied between the probe and the specimen produces a tunnelling current at tip 12 to sense characteristics of the surface 18. A feedback signal sensitive to the height of the tip above the surface may be used to adjust the height to maintain a desired tunnelling current level. Such probes are generally known, and are used to scan the surface of a specimen.

A high aspect ratio gated probe, generally indicated at 30 in FIG. 2, has now been developed for use in scanned probe instruments to provide improved sensing of a surface. The probe 30 is in the form of an elongated post or shaft which is mounted at one end 31 (the upper end in FIG. 2) on an actuator 32 or, in the preferred form, is fabricated integrally with the actuator, with the opposite (lower) end of the post being free. Probe 30 is circular in cross-section in the preferred form of the invention, although it may be oval, polygonal, or any other cross-sectional shape.

The actuator 32 is mounted for three-dimensional motion, as illustrated with respect to FIGS. 1 and 2, to provide mechanical positioning and scanning of the probe with respect to the adjacent surface 18. The elongated post tapers inwardly at its lower end, as illustrated in FIG. 2, to incorporate a tip 34. This tip is integrally formed at the free (lower) end of post portion 36 of probe 30. The post is surrounded along its length by a coextensive, radially spaced, self-aligned coaxial gate electrode 38 and is electrically insulated from the electrode by an insulating layer 40 which extends at least partially along the post portion. At the free (lower) end of the probe as viewed in FIG. 2, the electrode 38 forms an aperture 42 through which the tip 34 may protrude, the aperture having a radius ranging from 20 to 800 nm with the tip being centered within the aperture and spaced from the electrode.

To operate the probe in a field emission or a tunnelling mode, a voltage source 44 is connected between the surface 18 of sample 20 and the tip 34, as by way of actuator 32, the voltage $V_1$ resulting in an electric field 46 between the tip 34 and the surface 18. This field is inversely proportional to the tip radius and is proportional to the applied voltage 44. A second voltage source 48 is connected between the actuator 32 (and thus tip 34) and electrode 38 to produce a gating voltage $V_2$ between the tip 34 and its surrounding aperture 42 to control current flow from the tip, to control the electric field at the tip, or both.

The process for fabricating the gated probe 30 is illustrated in FIGS. 3(a) through 3(h), to which reference is now made. In this process, the high aspect ratio probe is fabricated from a substrate 50 which may be an n-type phosphorous-doped, 18–40 ohm-cm, (100) oriented single crystal silicon material. A layer 52 of $n^+$-type, heavily doped silicon is formed by implanting arsenic to a dose of $5 \times 10^{14}/cm^2$ at 30 keV, and by thermal annealing during subsequent high temperature process steps.

A dielectric stack 54 is formed on the top surface of the doped silicon substrate 50. The stack typically consists of a 20-nm thermal silicon dioxide layer 56, a 150 nm low-pressure chemical vapor deposition (LPCVD) nitride layer 58 and a 600-nm plasma-enhanced chemical vapor deposition (PECVD) oxide layer 60. Thereafter, a 700-nm thick film of KTI-OCG photoresist 62 is applied over the substrate 54 and is exposed and developed in conventional manner to produce a desired pattern. The pattern for producing the high aspect ratio probe 30 preferably is a circular island of photoresist (in top plan view), for producing a generally cylindrical probe post 36, although other pattern shapes may be used if desired. The developed photoresist pattern is then transferred to the dielectric stack 54 using $CHF_3$-Reactive Ion Etching (RIE), with the resulting dielectric island, illustrated at 64 in FIG. 3(b), serving as an etch mask for subsequent processing. The mask has the same shape as the pattern formed in the photoresist, and thus preferably is circular.

The shape of the dielectric island 64, and thus of the pattern, is transferred to the substrate silicon 50 by an $SF_6$-RIE etch to produce a tapered silicon structure 66 (FIG. 3b) centered axially under the island 64. The cross-sectional profile of structure 66 produced by the etching step is determined by the size and shape of the etch mask, and particularly of the oxide layer 60 at the top of island 64. With a circular island pattern, the structure 66 will be generally conical in shape, but it will be understood that other shapes may be provided. The tapered structure will herein be referred to as a cone for convenience.

The etching time required for producing the generally conical structure 66 is determined by the diameter and the aspect ratio desired for the shaft 36 and for the tip portion 34 of the probe which is to be formed, for as is further described below, the tip is fabricated from cone 66. For example, the island 64 may be circular with a diameter of 600 nm to produce the circular cone 66. In one embodiment of the invention, the silicon etch is performed with $SF_6$—$O_2$ with a gas flow rate of 4 SCCM/2SCCM, a chamber pressure of 5 mTorr, a DC bias of −300V and an etch time of 5 minutes.

After etching the substrate to form the cone 66, a 100 nm thick silicon dioxide layer 68 (FIG. 3c) is thermally grown on the exposed silicon surface of the cone and on the adjacent substrate to reduce the lateral dimensions of the cone and to lower the top surface 70 of the substrate 50 by consuming some of the surface silicon. The dielectric stack 64 remaining from the previous silicon etch step serves as an oxidation mask to protect the top of the cone 66. After the oxidation step, $CHF_3$ RIE is used to etch the oxide on the horizontal top surface 70, thereby removing the silicon dioxide which covers the base of the silicon cone where it meets substrate 50, and etching away some of the oxide layer 60 on the top of the stack 64. The silicon dioxide layer 68 on the vertical surface of the cone 66 is retained.

Figure 3F:
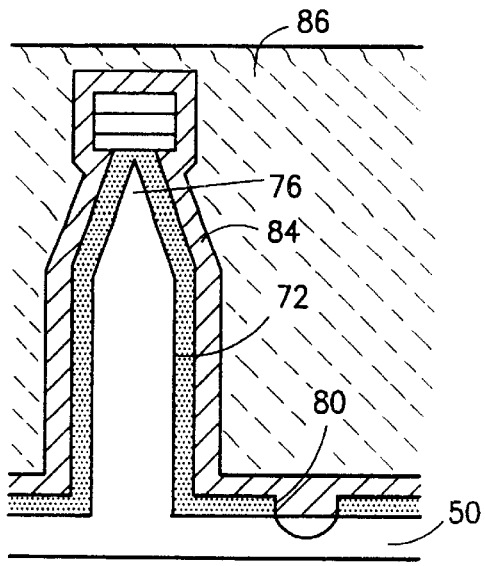
Figure 3D:
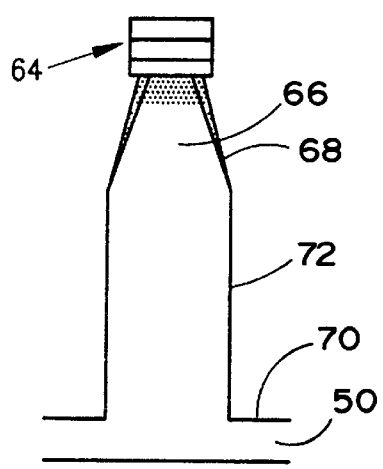

Removal of the silicon dioxide layer from the horizontal surface of the silicon substrate 50 surrounding the cone allows the silicon to be further etched around the cone, moving the top surface 70 of the substrate downwardly in the manner illustrated in FIG. 3(d). This preferably is carried out by means of a $Cl_2$-RIE etch wherein a $Cl_2/BCl_3$ gas flows at a rate of 50 sccm/2 sccm, with a chamber pressure of 20 mTorr and a DC bias of −400V. The etch is continued sufficiently long to produce a silicon post 72 underneath the silicon cone 66. This post preferably is between 5 and 10 μm in height, with a cross-sectional shape and dimension equal to the shape and dimension of the base of cone 66 and its oxide layer 68.

Figure 3G:
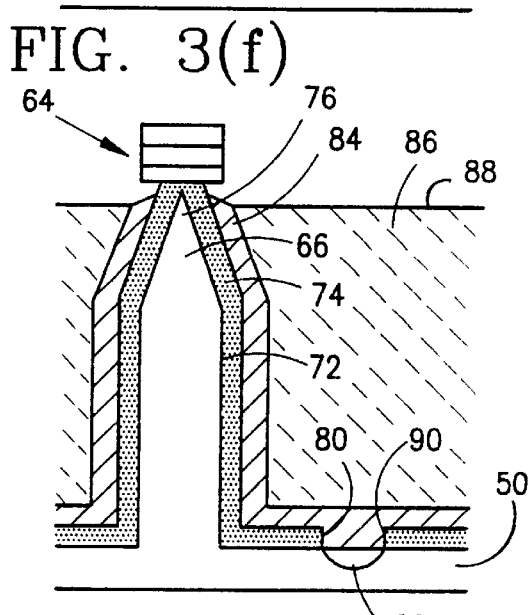
Figure 3E:
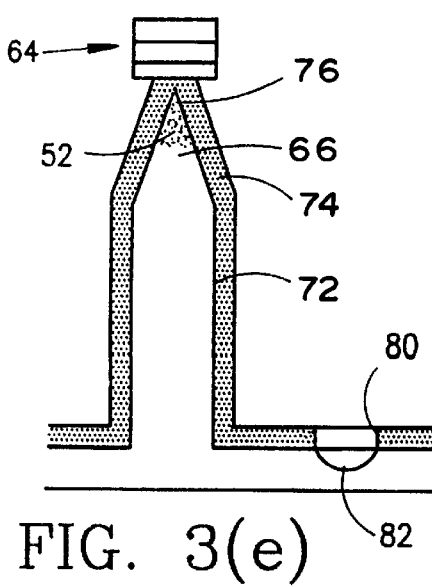

Following the formation of the silicon post 72, the silicon structure is thermally oxidized, as illustrated in FIG. 3(e), to reduce the lateral dimension of the post and to surround the post with a layer 74 of silicon dioxide to a thickness in the range of about 20 to 800 nm. This second oxidation step sharpens the cone 66 at its upper end to form a sharp tip 76, causes the post 72 to become needle-like in overall configuration to enhance its high aspect ratio, and provides a conformal dielectric coating. For a cylindrical post, this oxidation step reduces the minimum diameter of the post to between about 0.2 μm and 1.0 μm, and reduces the diameter of the tip 76 to about 20 nm, in a preferred form of the invention.

In order to permit electrical connections to the silicon tip, metal-contact windows may be opened in the silicon dioxide layer 74, as illustrated at 80. Ohmic metal contacts between conductor pads and the substrate silicon 50, and thus to the emitter tip 76, are provided by implanting arsenic ions in the silicon substrate through aperture 80 at 30 keV to a dose of $5 \times 10^{15}/cm^2$, followed by a rapid thermal annealing step at 1000° C. for 30 seconds. Such a metal contact is illustrated at 82.

Thereafter, a metal layer of, for example, $Ti_{0.1}W_{0.9}$ is sputter deposited to a thickness of about 200 nm over the conformal dielectric layer 74 covering the silicon needle 72, as illustrated at 84 in FIG. 3(f). Thereafter, a planarizing material 86 is applied over the TiW layer 84, covering the probe 72, the island 64, and the entire metal layer 84. This planarizing material can be a photoresist or a polyamide, or may be a planarizing resist. Preferably, a KTI-OCG photoresist is used because such a material can easily planarize the surface with a simple photoresist spinning step followed by baking at 90° C. This photoresist is also easily removable using acetone. As illustrated in FIG. 3(f), the photoresist covers the tip and the island 64, although it is thinner at this location than over the remainder of the surface.

Figure 3H:
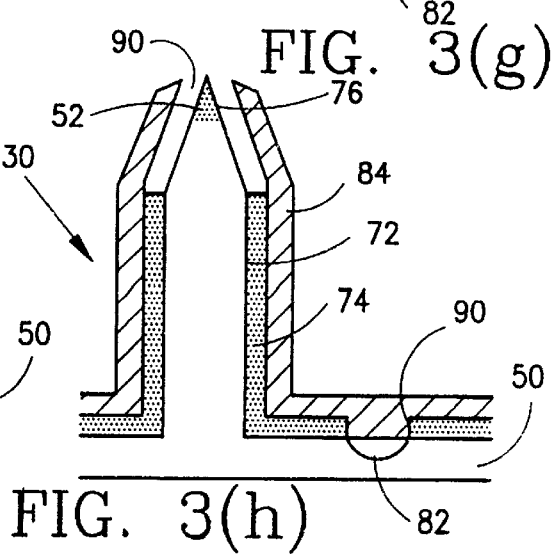

An $O_2$ plasma etch is used to etch back the photoresist 86 until the TiW layer around the island 64 and above the tip 76 is exposed. The exposed TiW layer 84 is then etched, using $SF_6$ RIE, while the portion of the TiW layer 84 lying underneath the photoresist layer 86 is protected. FIG. 3(g) illustrates the removal of the TiW above the top surface 88 of the planarizing material 86 to thereby expose the island 64 and a portion of the oxide layer 74 beneath the island. Thereafter, the silicon dioxide layer 74 covering the tip 76 is removed, using, for example, a buffered hydrofluoric acid solution. This causes the island 64 to be removed, and etches the portion of the silicon dioxide layer 74 which surrounds the tip 76 and the cone 66 formed at the top of post 72, as illustrated in FIG. 3(h). This removal of a portion of the silicon dioxide layer 74 opens a gap 90 between the tip 76 and the surrounding metal layer 84, with the gap extending along the cone region 66. Thereafter, the remaining photoresist material 86 is removed using an acetone solvent to produce the probe structure 30 illustrated in FIG. 3(h). As illustrated, the probe thus consists of an elongated needle tapering to a sharp tip and surrounded by a coaxial, coextensive metal electrode. The electrode is spaced from the needle by a layer of insulation along most of its length, but is uninsulated at the tip, although spaced.

Figure 3I:
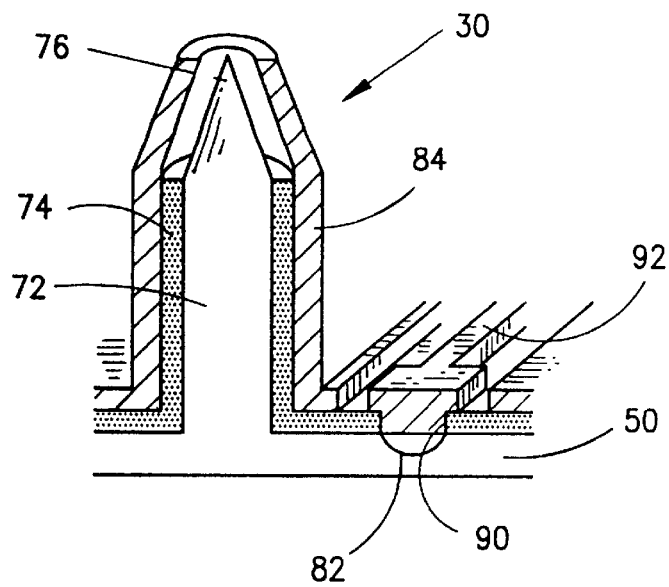

After the gate aperture 90 is opened and the resist material 86 is removed, the conductor pads 92 (FIG. 3(i)), which are to be used to connect external electric circuitry to the tip 76 by way of substrate 50 and post 72 are patterned on the surface of the TiW layer 84 by photolithographic and $SF_6$ RIE steps. An acetone solvent and an $O_2$ plasma etch are used to clean away the photoresist used for patterning the conductor pads and the TiW is subjected to a sintering step in an $H_2/N_2$(25SCCM/80SCCM) ambient at 600° C. for 30 seconds to obtain the ohmic metal-contacts through aperture 90 and contact 82. Finally, the native silicon dioxide on the exposed silicon tips 76 is removed by buffered hydrofluoric acid solution, completing formation of the probe 30 illustrated in FIGS. 2 and 3(i).

Although the process steps of FIGS. 3(a) through 3(i) illustrate only a single probe, it will be understood that an array of probes may be fabricated simultaneously on the substrate 50. These probes or groups of probes may then be cut apart using a diamond blade dicing saw. The resulting finished device is a silicon chip carrying one or more gated silicon probes with bonding conductor pads for electrical connections. The individual probe chip may then be mounted on an x-y-z translator, in the manner described with respect to FIG. 2, or may be mounted on a 24-pin integrated circuit package, for example.

The probe tip in the embodiment illustrated above preferably is doped, as illustrated at 52, for improved electron emission. Alternatively, a metal or metal silicide may be provided on the emitter tip to reduce the turn-on voltage of the emitter. Metal suicides are desirable, since such materials are used as gate-level interconnects in VLSI circuitry due to their high electrical conductivity, and their stability in fabrication processes has been well established. Furthermore, high-temperature solid state reactions between metals deposited on silicon emitters can be activated by sintering at temperatures ranging from 600° to 1000° C., and suicides produce strong metal-silicon bond. To make a metal silicide or a metal-coated tip, the desired metal is deposited on the silicon tip after the gate aperture 90 is opened. Preferably, the conductor pads 92 are patterned together with the depositing of such emitting silicide materials. The metals are then subjected to a sintering step to obtain both the metal-silicide material and the ohmic metal contacts. Such a silicide is illustrated at 94 in FIG. 2.

Although the process of FIGS. 3(*a*) through 3(*i*) illustrate the fabrication of a field emission probe, it will be understood that high aspect ratio silicon tips without metal gates may be provided utilizing the process steps of FIGS. 3(*a*) through 3(*e*). In this case, after the conformally coated structure of FIG. 3(*e*) is produced, a buffered hydrofluoric acid solution is used to remove the silicon dioxide 74, thereby removing the island 64 and exposing the post 72 and its tip 76. The tip 76 can then be conformally coated with desired metals or metal silicides, as described above.

Both the etch and oxidation steps for the formation of the cone 66 with its tip 76 and the formation of post 72 are performed separately. As a result, the sizes of the tips and post are not interdependent, although they are self-aligned. As discussed above, the tips preferably are formed from n+ type, arsenic-doped silicon which is capable of being used to fabricate the metal-silicon or metal-silicide tips described above. The material of the post portion 72 is the same as that of the substrate 50, and thus is an n⁻-type so that the post is a 1 Mohm feedback resistor which has a diameter of 600 nm and a height of 5 to 10 $\mu$m. By controlled doping of the substrate, a larger or smaller resistance can be obtained. This resistance provides effective feedback protection for the emitter tip, preventing excess current during emission of electrons which can damage the tip.

In an experimental fabrication of the probe 30 in accordance with the foregoing process, the field emitter post had a diameter of about 600 nm, as indicated above, the spacing between the outer surface of the post and the inner surface of the surrounding electrode layer 84 was about 240 nm, and the electrode layer 84 was about 200 nm thick. In fabrication of this device, the gate aperture 90 is spaced from the tip 76 by the thickness of the insulating layer 74, and is etched back to have a diameter of between about 200 and about 800 nm, with the apex of tip 76 extending slightly above the top of the gate electrode, as viewed in FIG. 3(*h*).

Figure 4:
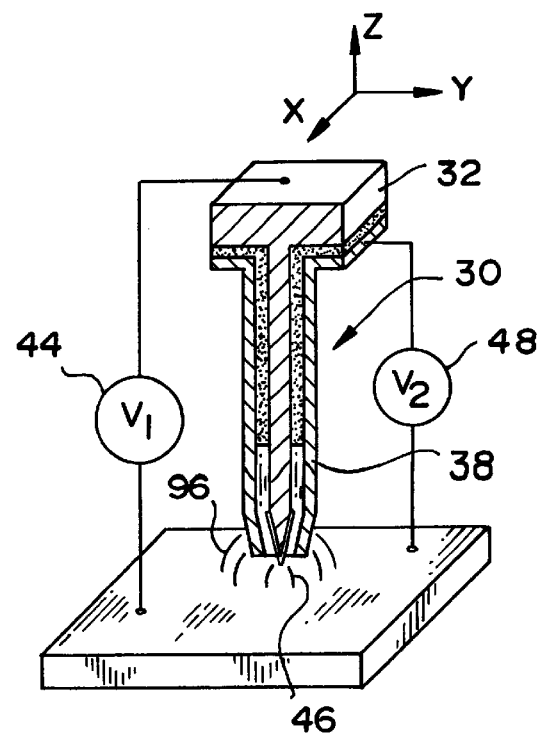
FIG. 4 illustrates in diagrammatic form a modification of the probe of FIG. 2.

A modification of the probe of FIG. 2 is illustrated in FIG. 4, wherein the voltage $V_1$ is applied between substrate 32 (and thus tip 34) and sample 20 and voltage $V_2$ is applied between electrode 38 and sample 20. Voltage $V_1$ produces an electric field 46 between the tip and the substrate for use in sensing characteristics of the surface of the sample, as discussed above, while voltage $V_2$ produces a second electric field 96 which extends between the electrode and the sample. The difference between the voltages $V_1$ and $V_2$ controls the field on tip 34, while the voltage $V_2$ controls the field 96. This outer field provides a protective shield around field 46, and provides control over the region of the surface of sample 20 when the tip is operating to sense sample surface characteristics, for example.

Although not illustrated, it will be understood that additional concentric electrodes, spaced by insulating layers, can be provided around the probe, with individual control voltages connected in the manner described above to produce multiple protective and control fields.

Although the present invention has been described in terms of a preferred embodiment, it will be apparent to those of skill in the art that variations and modifications may be made without departing from the true spirit and scope thereof, as set forth in the following claims.

What is claimed is:

1. A process of fabricating high aspect ratio probes, comprising:

covering a top surface of a substrate of single crystal silicon with successive first oxide, nitride and second oxide layers to form a dielectric stack;

producing on said stack an island pattern of resist material defining the location of a probe to be fabricated in the substrate;

transferring said island pattern to said dielectric stack to thereby produce an oxide, nitride, oxide dielectric island;

etching said silicon substrate utilizing said second oxide dielectric layer as an etch mask to produce a silicon cone beneath and centered on said dielectric island, said cone having an etch profile defining an apex under said island and a wall tapering downwardly and outwardly to a cone base, level with an etched horizontal top surface of said substrate surrounding said base;

thermally growing a third oxide layer on the wall of said cone and on said top surface of said substrate;

removing said third oxide layer from said top surface surrounding said cone base and leaving said third oxide layer on said wall;

etching said top surface around said base to remove substrate silicon to thereby form a post below and vertically aligned with said cone, said post being integral to said cone and having a vertical dimension greater than its horizontal dimension;

thermally oxidizing said post and said cone to reduce the dimensions thereof, thereby producing a silicon needle having a sharpened tip beneath said dielectric island and to produce a conformal electrically insulating layer on said needle;

covering said insulating and said dielectric island layer with a gate metal layer;

depositing a masking layer on said gate metal layer;

etching said metal from said island and to a depth along said needle to form a gate aperture surrounding said sharpened tip; and removing said conformal insulating layer from the sharpened tip to provide a gap between said gate aperture and said tip to thereby produce a high aspect ratio gated probe.

2. The process of claim 1, wherein depositing the masking layer comprises depositing a planarizing layer over said gate metal layer and etching said planarizing layer to expose said gate metal on said island and to a depth with respect to said tip prior to said step of etching said metal.

3. The process of claim 2, further including removing said planarizing layer to free said probe.

4. The process of claim 1, wherein said step of thermally oxidizing said post and said cone is continued for a time period sufficient to produce a needle having a diameter in the range of about 200 nm to 1 μm and a conformal oxide layer having a thickness in the range of about 20 to 800 nm.

5. The process of claim 1, wherein the step of etching said substrate top surface is continued for a time period sufficient to produce a needle having a height greater than about 5 μm.

6. The process of claim 1, wherein said step covering said conformal insulating layer and said dielectric island with metal includes depositing a layer of metal to a thickness of about 200 nm.

7. The process of claim 1, further including, prior to covering said insulating layer with a gate metal layer, forming in said conformal insulating layer a metal contact window to expose said silicon substrate, whereby said gate metal layer will contact said substrate during the step of covering said insulating layer with said gate metal layer.

8. The process of claim 7, further including implanting said exposed silicon substrate with ions to produce in said substrate an ohmic metal contact.

9. The process of claim 1, further including implanting said top surface of said single crystal silicon substrate to form a layer of $n^+$ type, heavily doped silicon in which the apex of said cone is formed to produce a heavily doped emitter tip.

10. The process of claim 1, further including supplying a substrate of n-type 18–40 ohm-cm single crystal silicon to produce a resistive gated emitter probe.

11. A process of fabricating high aspect ratio probes, comprising:

forming a dielectric stack on a top surface of a substrate of single crystal silicon;

producing in said stack an etch mask pattern including an island defining the location of a probe to be fabricated in the substrate;

etching said silicon substrate through said etch mask to produce a tapered silicon structure beneath and centered on said island, said tapered structure having an etch profile defining an apex under said island and a wall tapering downwardly and outwardly to a base, and to produce an etched horizontal top surface of said substrate extending from and surrounding said base;

etching said top surface around said base to form a post below and vertically aligned with the base of said tapered structure of said cone, said post being integral to said cone and having a vertical dimension greater than its horizontal dimension;

thermally oxidizing said post and said tapered structure produce an elongated silicon needle having a sharpened tip and to produce a conformal electrically insulating layer on said needle; and forming a gate metal layer on said insulating layer, said metal layer forming a gate aperture surrounding said sharpened tip.

12. The process of claim 11, wherein said step of thermally oxidizing said post and said tapered structure is continued for a time period sufficient to produce a needle having a diameter in the range of about 200 nm to 1 μm and a conformal oxide layer having a thickness in the range of about 20 to 800 nm.

13. The process of claim 11, further including connecting a first voltage source to said needle and a second voltage source to said gate metal layer.

14. The process of claim 13, including connecting said second voltage source between said needle and said gate metal layer.

15. The process of claim 13, further including positioning said needle tip adjacent a sample surface and connecting said first voltage source between said needle and said sample to produce a first electric field between said needle tip and said sample surface.

16. The process of claim 15, including connecting said second voltage source between said needle and said gate metal layer.

17. The process of claim 15, including connecting said second voltage source between said gate metal layer and said sample to produce a shielding electric field between said gate metal layer and said sample surface, said shielding electric field surrounding said first electric field.

* * * * *